United States Patent
Uchiyama

(10) Patent No.: US 6,283,381 B1
(45) Date of Patent: Sep. 4, 2001

(54) DIAGNOSTIC APPARATUS OF COOLANT TEMPERATURE SENSOR, DIAGNOSTIC APPARATUS OF COOLING APPARATUS AND METHOD

(75) Inventor: Katsuaki Uchiyama, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/425,059

(22) Filed: Oct. 22, 1999

(30) Foreign Application Priority Data

Oct. 27, 1998 (JP) .................................................. 10-305871

(51) Int. Cl.$^7$ ............................. G05B 23/02; F02D 45/00
(52) U.S. Cl. ....................... 236/94; 236/34.5; 123/41.15; 123/479
(58) Field of Search ............................... 236/34, 34.5, 35, 236/35.2, 35.3; 165/11.1; 62/125, 126, 127, 129, 130; 123/464, 479, 41.15

(56) References Cited

U.S. PATENT DOCUMENTS

| 4,274,381 | 6/1981 | Abo | 123/479 |
| 4,556,029 | 12/1985 | Yamaguchi et al. | 123/41.15 |
| 4,780,826 | 10/1988 | Nakano et al. | 123/479 X |
| 4,804,139 | 2/1989 | Bier | 236/35 |
| 5,153,835 | 10/1992 | Hashimoto et al. | 123/479 X |
| 5,305,723 | 4/1994 | Kadota | 123/479 |
| 5,307,644 | 5/1994 | Cummins et al. | 236/35 X |

FOREIGN PATENT DOCUMENTS 10-73047  3/1998  (JP) .

*Primary Examiner*—Harry B. Tanner
(74) *Attorney, Agent, or Firm*—Foley & Lardner

(57) ABSTRACT

In a disclosed diagnostic apparatus and a diagnostic method of a coolant temperature sensor, a time point when a predetermined time is elapsed after an engine started or when a predetermined heat amount is generated in the engine after the engine started is set as a measuring timing. A variation amount of output of the coolant temperature sensor from the start of the engine to the measuring timing is calculated, and it is judged that a trouble occurs in the coolant temperature sensor when the variation amount is smaller than a predetermined value. The apparatus and the method are preferably applied to diagnosis of a cooling apparatus comprising a cooling section for carrying off heat of the engine by coolant to cool the engine, a radiator for radiating the heat carried off by the coolant, and a thermostat for controlling a flow rate of the coolant which circulates via the cooling section and the radiator.

10 Claims, 8 Drawing Sheets

DIAGNOSTIC APPARATUS OF COOLANT TEMPERATURE SENSOR, DIAGNOSTIC APPARATUS OF COOLING APPARATUS AND METHOD

BACKGROUND OF THE INVENTION

The present invention relates to a diagnostic apparatus of a coolant temperature sensor, a diagnostic apparatus of a cooling apparatus and method, and particularly to those applied to an engine of a vehicle.

In Japanese Patent Application Laid-open No. H10-73047, there is disclosed that a counter for measuring the time after an engine started is provided, and that when the measured time exceeds a predetermined value, if the coolant temperature detected by a water temperature sensor does not reach a judgment value, it is judged that a trouble of output drop occurs in the water temperature sensor.

SUMMARY OF THE INVENTION

Meanwhile, according to such a conventional trouble diagnostic system, when a trouble that the output of the sensor sticks to a value exceeding the judgment value used for diagnosis of the water temperature sensor even though the actual water temperature is lower than the judgment value, it is impossible to judge that the water temperature sensor is in trouble.

This will be explained below. When a trouble of output drop occurs in the water temperature sensor, as shown in FIG. 12A, rising movement of water temperature TWN is slow or gentle (see broken line) as compared when the water temperature sensor is normal (see solid line). At that time, the coolant temperature at a judging timing t is smaller than a judgment value $TW_D$, and it is judged that a trouble occurs in the water temperature sensor. Whereas, in the case of trouble that the sensor output sticks to a value exceeding the judgment value $TW_D$, as shown in FIG. 12B, the coolant temperature TWN at the judging timing t becomes equal to or greater then the judgment value $TW_D$ as in FIG. 12A, so it is not judged that the trouble occurs.

Thereupon, in diagnosis of a water temperature (a coolant temperature sensor), it is an object of the present invention to supply a diagnostic apparatus and a diagnostic method of a coolant temperature sensor capable of diagnosing the trouble of output drop of the water temperature sensor, by judging that the water temperature sensor is in trouble when the output of the water temperature sensor is not varied more than a predetermined value until a predetermined time is elapsed or a sufficient heat is generated after the engine started, and capable of diagnosing a trouble that the output from the sensor sticks to a value exceeding the judging value (judging value used for conventional diagnosing system of the sensor).

Further, in order to utilize the result of diagnosis of the water temperature sensor for diagnosing a thermostat such as leakage, it is another object of the invention to provide a diagnostic apparatus and a diagnostic method of a cooling apparatus which prevent error in diagnosis of the thermostat, due to the influence of trouble of the water temperature, by prohibiting the diagnosis of the thermostat when the water temperature sensor is in trouble.

In the present invention, a diagnostic apparatus of a coolant temperature sensor sending out an output in correspondence to a temperature of a coolant of an engine, comprises: a setting section setting, as a measuring timing, a time when a predetermined time is elapsed after the engine started or a time when a predetermined heat is generated; a calculating section calculating a variation amount of the output of the coolant temperature sensor from a start of the engine to the measuring timing; and a judging section judging that a trouble occurs in the coolant temperature sensor when the variation amount is smaller than a predetermined value.

When the trouble of output drop occurs in the sensor, the water temperature rises from the start of the engine more slowly as compared when the sensor is in normal. At that time, the variation amount of the sensor output from the start of the engine to the measuring timing becomes smaller than the predetermined value and thus, it is judged that a trouble occurs in the sensor. On the other hand, also when the trouble that the output of the sensor sticks to a value exceeding the judgment value (judgment value used for conventional trouble diagnosis of the sensor), the variation amount of the sensor output from the start of the engine to the measuring timing becomes smaller than the predetermined value and thus, it is also judged that a trouble occurs in the sensor.

According to this structure, it is possible to judge the trouble that the output of the sensor sticks to a value exceeding the judgment value (judgment value used for conventional trouble diagnosis of the sensor), in addition to the trouble of output drop of the sensor.

In other words, in the present invention, a diagnostic apparatus of a coolant temperature sensor sensing a temperature of a coolant of an engine, comprises: setting means for setting a measuring timing; calculating means for calculating a variation amount of the temperature of the coolant from a start of the engine to the measuring timing; and judging means for judging that a trouble occurs in the coolant temperature sensor when the variation amount is smaller than a predetermined value.

Besides, in the present invention, a diagnostic method of a coolant temperature sensor sensing a temperature of a coolant of an engine, comprises: setting a measuring timing; calculating a variation amount of the temperature of the coolant from a start of the engine to the measuring timing; and judging that a trouble occurs in the coolant temperature sensor when the variation amount is smaller than a predetermined value.

Further, a diagnostic apparatus of a cooling apparatus of the invention is applied to a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator. The diagnostic apparatus comprises: a coolant temperature sensor sending out an output in correspondence to a temperature of the coolant; a setting section setting, as a measuring timing, a time when a predetermined time is elapsed after the engine started or a time when a predetermined heat is generated; a sampling section sampling the temperature of the coolant at the measuring timing based on the output of the coolant temperature sensor; a judging section judging that a trouble occurs in the thermostat when the temperature of the coolant at the measuring timing sampled by the sampling section is smaller than a first predetermined value; a calculating section calculating a variation amount of the output of the coolant temperature sensor from start of the engine to the measuring timing; and a prohibiting section prohibiting the judging section from judging when the variation amount is smaller than a second predetermined value.

If the leakage diagnosis of the thermostat is carried out using the output of the sensor which is in trouble, it may be erroneously diagnosed that thermostat has leakage. However, when the variation amount of the output of the sensor from the start of the engine to the measuring timing is smaller than the predetermined value, the leakage diagnosis of the thermostat is prohibited as the sensor has a trouble, and thus, it is possible to prevent the erroneous judgment that the thermostat has leakage.

In other words, a diagnostic apparatus of a cooling apparatus of the invention is applied to the above cooling apparatus, too, and comprises: temperature detecting means sending out an output in correspondence to a temperature of the coolant; setting means for setting a measuring timing; sampling means for sampling the temperature of the coolant at the measuring timing based on the output of the temperature detecting means; judging means for judging that a trouble occurs in the coolant control means when the temperature of the coolant at the measuring timing sampled by the sampling means is smaller than a first predetermined value; calculating means for calculating a variation amount of the output of the temperature detecting means from a start of the engine to the measuring timing; and prohibiting means for prohibiting the judging means from judging when the variation amount is smaller than a second predetermined value.

Besides, a diagnostic method of a cooling apparatus of the invention is applied to the above cooling apparatus, too, and comprises: sending out an output in correspondence to a temperature of the coolant; setting a measuring timing; sampling the temperature of the coolant at the measuring timing based on the output; judging that a trouble occurs in the thermostat when the temperature of the coolant sampled at the measuring timing is smaller than a first predetermined value; calculating a variation amount of the output from a start of the engine to the measuring timing; and prohibiting the judging when the variation amount is smaller than a second predetermined value.

Further, a diagnostic apparatus of a cooling apparatus of the invention is applied to the above cooling apparatus, too, and comprises: a coolant temperature sensor sending out an output in correspondence to a temperature of the coolant; a setting section setting a measuring section after the engine started; a sampling section sampling a maximum value of the output of the coolant temperature sensor in the measuring section; a first judging section judging whether a predetermined heat amount of the engine is generated in the measuring section; a second judging section judging whether the output of the coolant temperature sensor is converged in the measuring section; a third judging section judging that a trouble occurs in the thermostat when the first judging section judges that the predetermined heat amount of the engine is generated and the second judging section judges that the output of the coolant temperature sensor is converged in the measuring section, and when the maximum value of the output of the sensor in the measuring section sampled by the sampling section is smaller than a first predetermined value; a calculating section calculating a variation amount of the output of the coolant temperature sensor from a start of the engine to a start of the measuring section; and a prohibiting section prohibiting the third judging section from judging when the variation amount is smaller than a second predetermined value.

If the leakage diagnosis of the thermostat is carried out using the output of the sensor which is in trouble, it may be erroneously diagnosed that thermostat has leakage. However, when the variation amount of the output of the sensor from the start of the engine to the start of the measuring section is smaller than the predetermined value, the leakage diagnosis of the thermostat is prohibited as the sensor has a trouble, and thus, it is possible to prevent the erroneous judgment that the thermostat has leakage.

In other words, a diagnostic apparatus of a cooling apparatus of the invention is applied to the above cooling apparatus, too, and comprises: temperature detecting means sending out an output in correspondence to a temperature of the coolant; setting means for setting a measuring section; sampling means for sampling a maximum value of the output of the coolant temperature sensor in the measuring section; first judging means for Judging whether a predetermined heat amount of the engine is generated in the measuring section; second judging means for judging whether the output of the temperature detecting means is converged in the measuring section; third judging means for judging that a trouble occurs in the coolant control means when the first judging means judges that the predetermined heat amount of the engine is generated and the second judging means judges that the output of the temperature detecting means is converged in the measuring section, and when the maximum value of the output in the measuring section sampled by the sampling means is smaller than a first predetermined value; calculating means for calculating a variation amount of the output of the temperature detecting means from a start of the engine to a start of the measuring section; and prohibiting means for prohibiting the third judging means from judging when the variation amount is smaller than a second predetermined value.

Besides, a diagnostic method of a cooling apparatus of the invention is applied to the above cooling apparatus, too, and comprises: sending out an output in correspondence to a temperature of the coolant; setting a measuring section; sampling a maximum value of the output of the coolant temperature sensor in the measuring section; judging whether a predetermined heat amount of the engine is generated in the measuring section; judging whether the output of the temperature detecting means is converged in the measuring section; judging that a trouble occurs in the thermostat when it is judged that the predetermined heat amount of the engine is generated and that the output of the temperature detecting means is converged in the measuring section, and when the maximum value of the output in the measuring section is smaller than a first predetermined value; calculating a variation amount of the output in accordance with the temperature of the coolant from a start of the engine to a start of the measuring section; and prohibiting the judging that the trouble occurs in the thermostat when the variation amount is smaller than a second predetermined value.

DETAILED DESCRIPTION OF THE PREFERRED EMBODIMENT

An embodiment of the present invention will be explained in detail with reference to the drawings below.

Figure 1:
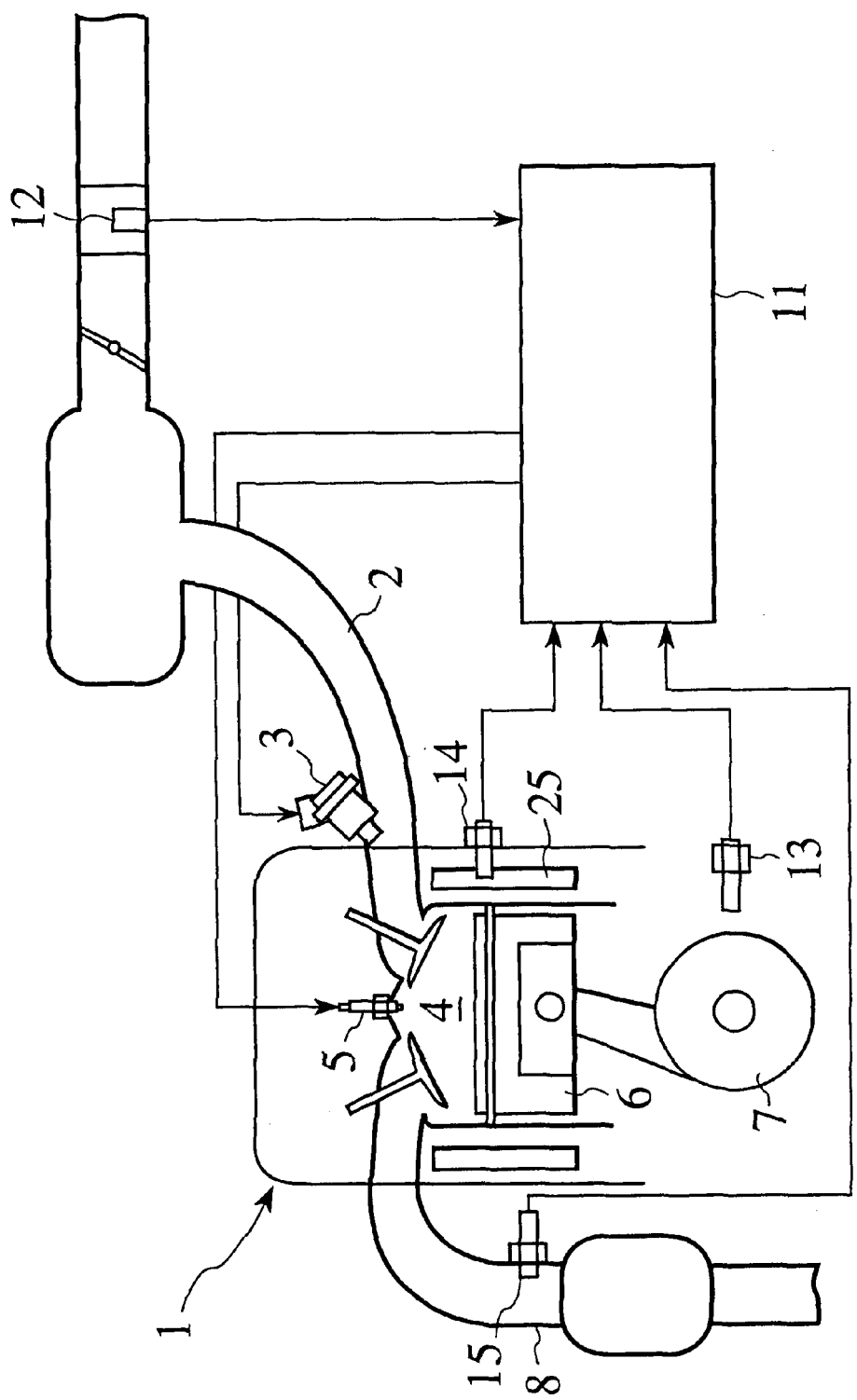
FIG. 1 shows a structure of an engine to which a diagnostic apparatus and a diagnostic method of an embodiment of the present invention are applied.

In FIG. 1, air sucked through a intake passage 2 of an engine 1 is mixed with fuel injected from an injector 3, thereby forming fuel-air mixture, and this mixture is ignited by spark of a spark plug 5 in a combustion chamber 4. A piston 6 is pushed down by combustion pressure. At that time, a crankshaft 7 which is operatively associated with a piston 6 receives rotation force and rotates. Burned gas is exhausted to atmosphere through an exhaust passage 8.

An intake air amount signal from an air flowmeter 12, an engine speed signal from a crank angle sensor 13, and a coolant temperature signal from a water temperature sensor 14 are input to a control unit 11 together with a signal from an $O_2$ sensor 15. Based on these signals, the control unit 11 controls a fuel injection amount from the injector 3 such that a ratio of an intake air amount and a fuel injection amount per one combustion cycle becomes equal to a predetermined value. The control unit 11 includes a microcomputer, a ROM, a RAM and an I/O port.

The engine 1 includes a cooling apparatus 20. The cooling apparatus 20 will be explained with reference to FIG. 2. Flow of the coolant is shown with arrows in FIG. 2.

Figure 2:
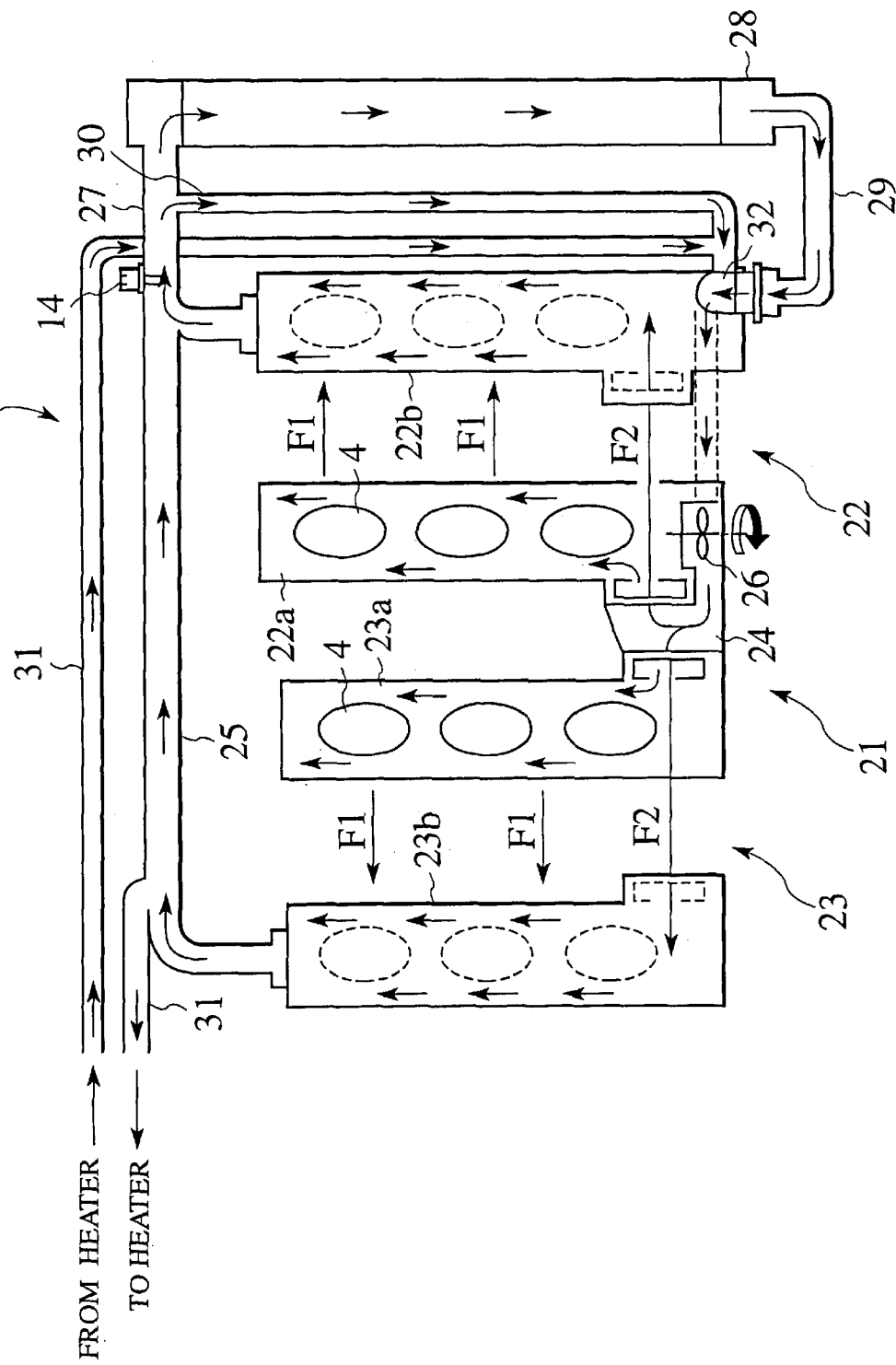
FIG. 2 shows flowing passages of a coolant of the engine of the embodiment.

A water jacket 21 is formed as a cooling portion for cooling around the combustion chamber 4. Since the engine 1 shown in FIG. 2 is a V-type six-cylinder engine, water jackets 22 and 23 are formed in each of banks. If a bank located on the right side in FIG. 2 is referred to as a right bank and a bank located on the left side in FIG. 2 is referred to as a left bank, the right water jacket 22 comprises a cylinder block side water jacket 22a and a cylinder head side water jacket 22b, and the left bank water jacket 23 comprises a cylinder block side water jacket 23a and a cylinder head side water jacket 23b. Two inlet ports of the cylinder block side water jackets 22a and 23a and two outlet ports of the cylinder head side water jackets 22b and 23b are connected to each other through communication passages 24 and 25.

The reference number 26 represents a water pump driven by rotation force of the crankshaft 7 through a belt and a pulley which are not shown. Coolant discharged from the water pump 26 circulates through the cylinder block side water jackets 22a and 23a and then, flows into the cylinder head side water jackets 22b and 23b (see the arrows F1), and flows from ends of the cylinder block side water jackets 22a and 23a directly into the cylinder head side water jackets 22b and 23b (see the arrows F2).

The coolant heated while flowing through the water jacket 21 in this manner is introduced into a radiator 28 through a passage 27, and is cooled by outside air. The cooled coolant is returned into the inlet port of the water jacket 21 through a passage 29 by the radiator 28.

There are also provided a bypass passage 30 for introducing the coolant flowing out from the outlet port of the water jacket 21 into the inlet port of the water pump 26 bypassing the radiator 28, and a heater passage 31 branching off from the communication passage 25 and merging with the bypass passage 30.

On the other hand, in the passage 29 for returning from the radiator 28, there is provided with a thermostat 32 for opening and closing the passage 29, and the bypass passage 30 merges with a downstream side of the thermostat 32. A temperature sensing portion of the thermostat 32 is provided downstream from the merging portion of the bypass passage 30.

If the warm-up of the engine is completed, the thermostat 32 is opened when the coolant temperature in the water jacket 21 exceeds a predetermined range, and the thermostat 32 is closed when the coolant temperature in the water jacket 21 drops lower than a predetermined range. When the coolant temperature in the water jacket 21 exceeds the predetermined range, the coolant is allowed to circulate through the radiator 28 and cooled, and when the coolant temperature in the water jacket 21 drops lower than the predetermined range, the coolant is allowed to flow through the bypass passage 30 so that the coolant is not cooled further. With this operation, the temperature of the coolant in the water jacket 21 is maintained in a predetermined temperature range.

Whereas, when the engine 1 starts in its cold state, the thermostat 32 is closed. At that time, the entire coolant flowing out from the water jacket 21 flows through the bypass passage 30, thereby facilitating the warm-up of the engine 1, and the exhausting amount of unburned fuel HC, CO is reduced.

If a trouble that leakage is generated around the thermostat 32 or the thermostat 32 is kept opening and can not be closed (which will be referred to as "leaking trouble" herein after), the coolant in the water jacket 21 circulates through the radiator 28 before the warm-up of the engine 1 is completed, so the warm-up of the engine 1 is delayed. If the warm-up of the engine is delayed, the exhausting amount of HC, CO is increased.

Figure 3:
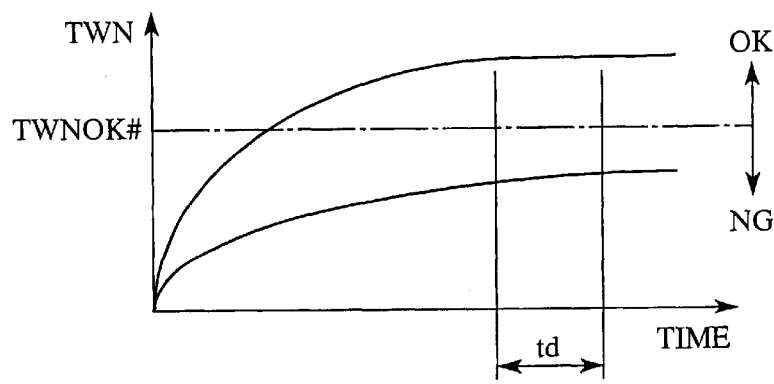
FIG. 3 shows output of a water temperature sensor of the embodiment.

To cope with this, in the control unit 11, as shown in FIG. 3 of which horizontal axis corresponds to time and vertical axis corresponds to the coolant temperature TWN, a measuring section td is determined after a predetermined time is elapsed after the engine started, and under conditions that sufficient heat is generated and output of the water temperature sensor is converged in the measuring section td, a maximum water temperature value TWTHMX and a judgment value TWNOK# are compared in the measuring section, and when the highest water temperature value TWTHMX in the measuring section td is smaller than the judgment value TWNOK#, it is judged that a leaking trouble occurs in the thermostat 32.

The diagnosis of the leaking trouble of the thermostat 32 will be explained with reference to flowcharts in FIGS. 4 and 5.

First, in step 1 (indicated with S1 in the drawings, and the subsequent steps will also be indicated in the same manner), an intake air flow rate QA detected by the air flowmeter 9 is converted into a heat amount generated by the engine per a predetermined time (per calculation cycle), and a value obtained by adding up this heat amount conversion values QATHMO after the start of the engine 1 is determined as a post-start heat amount adding up value SUQATH. The post-start heat amount adding up value SUQATH is initially set as 0 at the time when an ignition switch is changed from OFF to ON.

In step 2, diagnosing prohibiting flag F1 in the RAM of the control unit 1 is checked. If the diagnoses are not carried out during the current driving, since the diagnosing prohibiting flag F1 is equal to 0, the procedure is advanced to step 3 where it is judged whether a diagnosis permission condition C1 is established. The diagnosis permission condition C1 includes conditions that
1) the engine 1 is rotating, and
2) all of the air flowmeter 12, the crank angle sensor 13 and the water temperature sensor 14 are sending respective predetermined signals and do not have trouble.

When both the conditions 1) and 2) are satisfied, the diagnosis permission condition C1 is established.

When the diagnosis permission condition C1 is established, the procedure is advanced to step 4 where the coolant temperature TWN and a predetermined value TWNOK# (e.g., 70°) are compared with each other. If TWN≧TWNOK#, (i.e., the warm-up of the engine 1 is completed), the procedure is advanced to steps 16 and 17 shown in FIG. 5 where it is judged that the thermostat 32 is in normal (in the drawing, this is shown with "OK"), and the diagnosing prohibiting flag F1 is set to 1, and the current procedure is completed. By setting the diagnosing prohibiting flag F1 is equal to 1, further diagnosis is prohibited until an ignition switch is turned OFF once.

Figure 4:
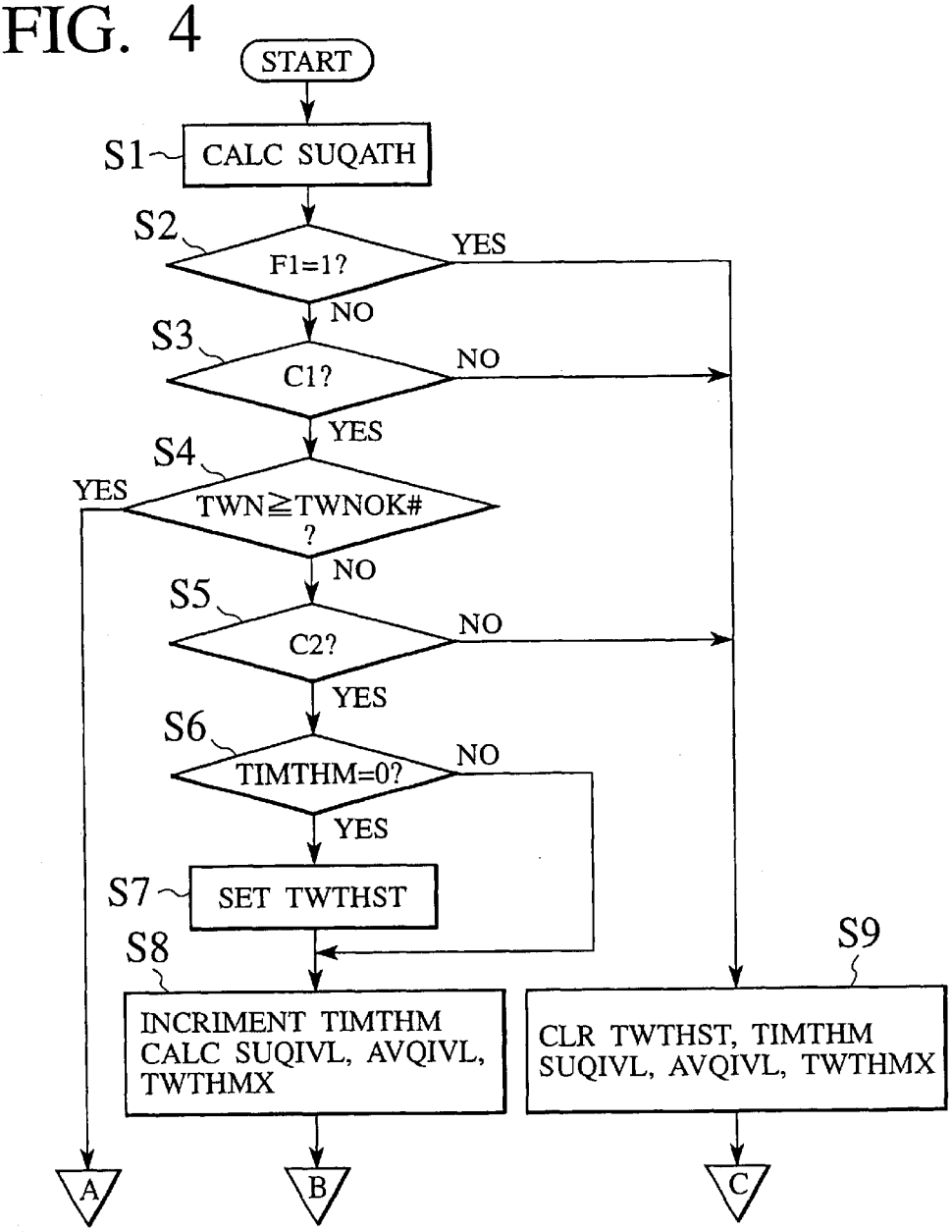
FIG. 4 is a flowchart for carrying out a leakage diagnosis of a thermostat of the embodiment.

On the other hand, when TWN<TWNOK#, the procedure is advanced to step 5 from step 4 shown in FIG. 4, and it is judged whether a leaking trouble judgment starting condition C2 is established.

The leaking trouble judgment starting condition C2 includes conditions that
3) post-start heat amount adding up value SUQATH is equal to or greater than a predetermined value TOQATH, and
4) driving time after the start is equal to or greater than a predetermined value TMTHMO#.

When both the conditions 3) and 4) are satisfied, the leaking trouble judgment starting condition C2 is established.

Here, when the coolant is frozen, the condition 3) is for judging whether heat amount of the engine enough to melt the entire frozen coolant is given. The condition 4) is necessary because if a certain time is not elapsed after the start of the engine 1, the engine 1 is not warmed.

When the leaking trouble judgment starting condition C2 is established, in order to start the measurement, the procedure is advanced to step 6 where a water temperature monitor timer TIMTHM is checked. When TIMTHM=0, it is time when the leaking trouble judgment starting condition C2 is established for the first time (i.e., at the time when measurement is started) and thus, the procedure is advanced to step 7, where the coolant temperature at the time of measurement start is moved to a water temperature monitor reference value TWTHST and set, the water temperature monitor timer TIMTHM is incremented in step 8 for measuring time in the measuring section td.

Figure 5:
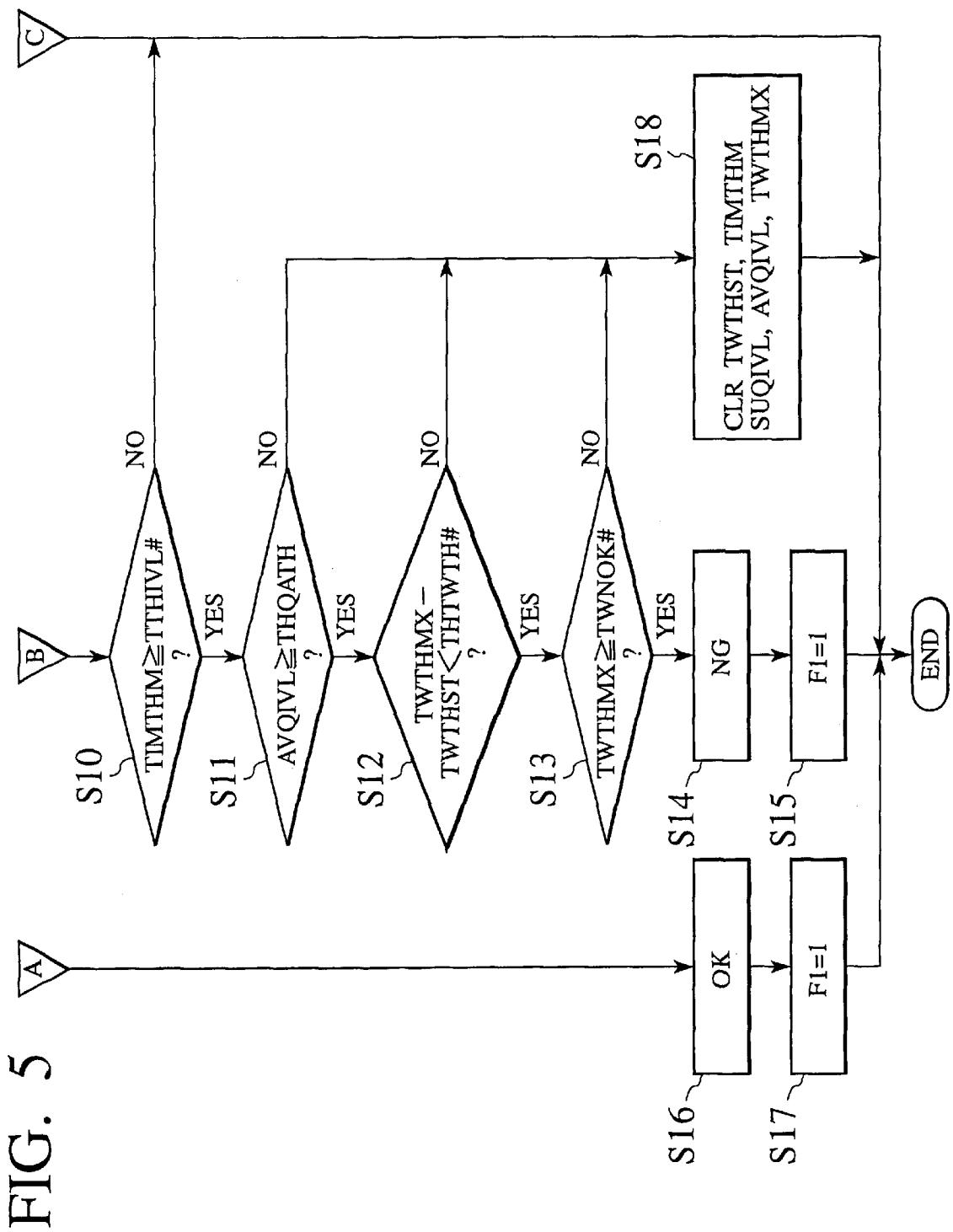
FIG. 5 is a flowchart for carrying out a leakage diagnosis of a thermostat of the embodiment.

Further, in step 8, a heat amount adding up value SUQIVL in the measuring section td, average heat amount AVQIVL in the measuring section td, and the coolant highest water temperature value TWTHMX in the measuring section td are calculated and then, the procedure is advanced to step 10 in FIG. 5.

Here, the measuring section td is a section from a timing (measurement starting timing) when the leaking trouble judgment starting condition C2 is established to a timing when the water temperature monitor timer TIMTHM coincides with a predetermined value TTHIVL# (see FIG. 3). Further, the heat amount adding up value SUQIVL is a value obtained by adding up heat amount conversion value QATHMO in the measuring section td (initial value is 0), and the average heat amount AVQIVL in the measuring section td is a value obtained by dividing the value SUQIVL by a time during the measuring section td.

Because of increment of the water temperature monitor timer TIMTHM, TIMTHM is not equal to 0 after the next time in step 6 and therefore, the processing in step 8 is carried out while bypassing step 7.

Next, in step 10 shown in FIG. 5, the water temperature monitor timer TIMTHM and the predetermined value TTHIVL# are compared with each other. When TIMTHM<TTHIVL#, the current processing is completed as it is, and when TIMTHM≧TTHIVL#, it is judged that the measuring section td is completed, and the procedure is advanced to step 11 and subsequent steps.

In steps 11 and 12, it is judged whether the following conditions 5) and 6) are established:
5) the average heat amount AVQIVL is equal to or greater than a predetermined value THQATH, and
6) a difference between the highest water temperature value TWTHX and the water temperature monitor reference value (coolant temperature when the measurement is started) TWTHST is smaller than a predetermined value THTWTH#.

Here, the condition 5) is for judging whether the engine 1 is sufficiently generating heat. The condition 6) is for judging whether the output of the water temperature sensor is converged.

If both the conditions 5) and 6) are satisfied (if sufficient heat amount of the engine is given to the coolant and the output of the water temperature sensor is converged, when the measuring section td is completed), the procedure is advanced to step 13 where the highest water temperature value TWTHX in the measuring section td and the judgment value TWNOK# are compared with each other, and when TWTHX<TWNOK#, the procedure is advanced to steps 14 and 15 where it is judged that the leaking trouble occurs in the thermostat 32 (shown with "NG" in the drawing), and the diagnosis is prohibited until the ignition switch is turned OFF once. It is also possible to light a warning lamp at the driver seat (not shown) to inform the driver of the fact that leakage trouble is generated in the thermostat 32.

On the other hand, since it is impossible to judge whether the leakage trouble is generated in the thermostat 32 when any of the conditions 5) and 6) is not satisfied, the procedure is advanced from steps 11 and 12 to step 18. When TWTHX≧TWNOK# in step 13, since it is impossible to judge that the leakage trouble is generated in the thermostat 32, the procedure is also advanced to step 18. In any of the cases, in step 18, TWTHST, TIMTHM, SUQIVL, AVQIVL and TWTHMX are cleared.

When the diagnosing prohibiting flag F1 is equal to 1 in step 2 shown in FIG. 4, if the diagnosis permission condition C1 is not established in step 3 in FIG. 4, or if the leaking trouble judgment starting condition C2 is not established in step 5 in FIG. 4, the procedure is advanced to step 9 where TWTHST, TIMTHM, SUQIVL, AVQIVL and TWTHMX are cleared.

With respect to the heat amount of the engine 1, it is also possible to correct the heat amount using vehicle speed, to correct the heat generation using vehicle speed, and to correct the heat radiation using outside air temperature.

As described above, the measuring section td is set after a predetermined time is elapsed from the start of the engine, the highest water temperature value TWTHMX in the measuring section td and the judgment value TWNOK# are compared under the condition that the heat amount in the measuring section td is sufficient, and when the highest water temperature value TWTHMX in the measuring section td is smaller than the judgment value TWNOK#, it is judged that the leaking trouble occurs in the thermostat 32. However, if a trouble that the output of the sensor sticks to a value smaller than the judgment value TWNOK# (stick trouble) occurs when the heat amount is sufficient by any reason (e.g., trouble of water temperature sensor element), there exists a possibility of course that it may be judged that the leaking trouble occurs in the thermostat 32 even if the thermostat 32 is in normal.

However, in the actual case, if a condition that the water temperature sensor 14 is not in trouble is added to the diagnosis permission condition for judging the leaking trouble of the thermostat 32 (see the above-described condition 2) so to diagnose the water temperature sensor 14 prior to diagnosis of leaking trouble of the thermostat 32, erroneous judgment that the leaking trouble occurs in the thermostat 32 is not made. Concerning the diagnosis of the water temperature sensor 32, the temperature of the coolant when a predetermined time is elapsed after the engine started is lower than the judgment value, there is a possibility that the trouble occurs in the water temperature sensor 14. Therefore, if the judgment value used for diagnosis of the water temperature sensor 32 is set to the same as the judgment value TWNOK# used for diagnosis of leakage trouble of the thermostat 32, when the trouble that the output of the sensor sticks to a value smaller than the judgment value TWNOK#, it is judged that the water temperature sensor 14 is in trouble even at the time of diagnosis of the water temperature sensor 14. Therefore, the diagnosis permission condition for diagnosis of the leakage trouble of the thermostat 32 is not established, and the diagnosis of the leakage trouble of the thermostat 32 is not carried out. The influence of the diagnosis of the water temperature sensor 14 exerted on the diagnosis of the leakage trouble of the thermostat 32 can be eliminated. However, there is generated a trouble that the output of the sensor sticks to a value exceeding the judgment value (stick trouble) even though the actual coolant temperature is lower than the above-described judgment value used for the diagnosis of the water temperature sensor 14, according to this diagnosis of the water temperature sensor 14, it is not possible to accurately judge that the water temperature sensor 14 is in trouble.

To cope with this, in the diagnosis of the water temperature sensor 14 prior to the diagnosis of the leakage trouble of the thermostat 32, the control unit 11 samples the highest water temperature and the lowest water temperature before predetermined judging timing (before the diagnosis of the water temperature sensor 14), a difference between the highest water temperature and the lowest water temperature (variation amount of the output of the water temperature sensor 14 from the start of the engine to the measuring time) and a predetermined value are compared with each other at the judging timing, and when the difference between the highest water temperature and the lowest water temperature becomes smaller than the predetermined value, it is judged that the water temperature sensor 14 is in trouble.

Figure 6:
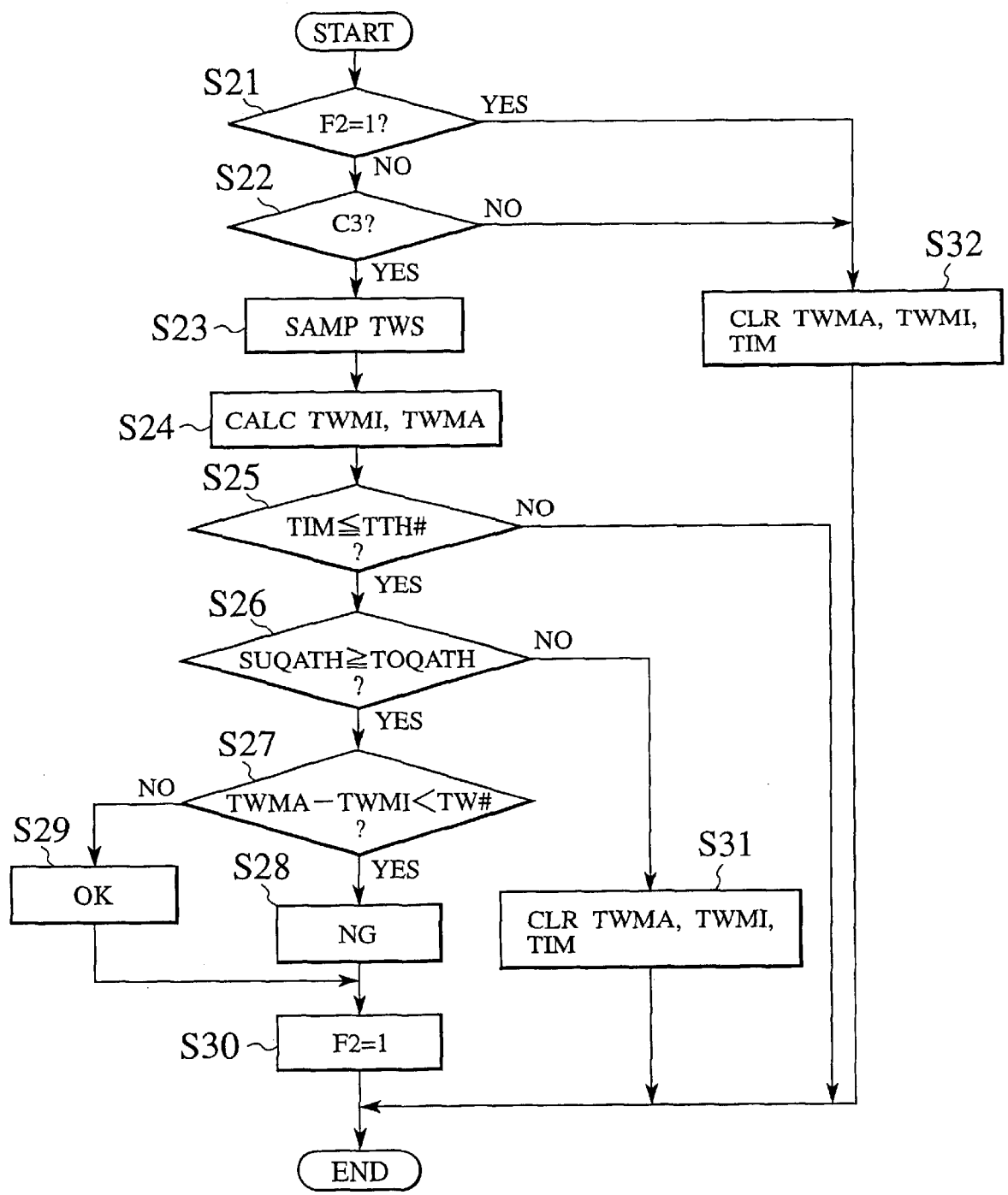
FIG. 6 is a flowchart for carrying out a diagnosis of the water temperature sensor of the embodiment.

Process of the diagnosis of the water temperature sensor 14 performed by the control unit 11 will be explained with reference to a flowchart shown in FIG. 6. This process is performed at predetermined intervals of, e.g., 10 ms, before the diagnosis of the leakage trouble of the thermostat 32 and after the engine started.

Since the basic structure of the diagnosis of the water temperature sensor 14 is substantially the same as that of the thermostat 32, this structure will be explained while comparing the diagnosis of the thermostat 32.

First, steps 21 and 22 are the same as the steps 2 and 3 in FIG. 4. That is, in step 21, a diagnosing prohibiting flag F2 is checked. If the diagnosis of the water temperature sensor 14 is not yet carried out at the time of the current driving, since the diagnosis prohibiting flag F2 is equal to 0, the procedure is advanced to step 22 where it is judged whether a diagnosis permission condition C3 is established. The diagnosis permission condition C3 includes the following conditions:

7) the engine 1 is rotating, and
8) both the air flow meter 12 and the crank angle sensor 13 are sending respective predetermined signals and do not have trouble. When both the conditions 7) and 8) are satisfied, the diagnosis permission condition C3 is established.

Here, unlike the above-described condition 2), it is needless to say that the condition 8) does not include the condition that the water temperature sensor 14 is not in trouble. However, it is possible to add the condition that the water temperature sensor 14 is not in trouble to the condition 8). The trouble of water temperature sensor 14 includes a broken wire trouble and other trouble, and the diagnosing methods therefor are different. Here, the trouble of water temperature sensor 14 means trouble other than the broken wire trouble (such as a trouble that the output of sensor is lowered and the stick trouble). Therefore, it is judged whether the broken wire trouble occurs in the water temperature sensor 14 by another routine if necessary.

When the diagnosis permission condition C3 is established, the procedure is advanced to steps 23 and 24 where the water temperature sensor output TWS is sampled, and the lowest water temperature TWMI and the highest water temperature TWMA after the start of the engine are calculated.

Figure 7:
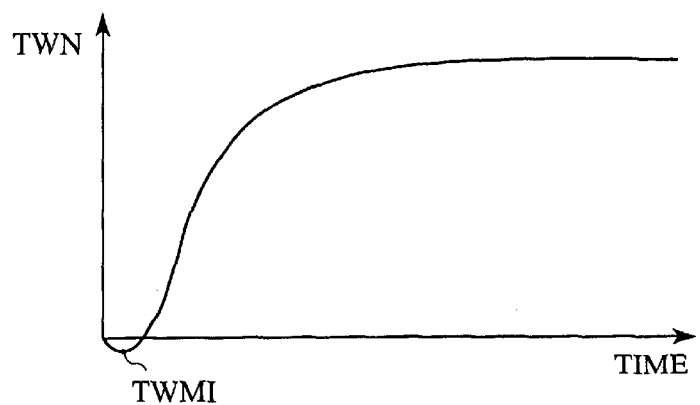
FIG. 7 shows one example of output of the water temperature of the embodiment.

Here, the reason why the lowest water temperature TWMI is calculated instead of the water temperature at the time of start of the engine 1 is to facilitate the warm-up of the engine 1 also in cold climates. In the case of an engine having such a block heater, when the engine 1 starts under the condition that the outside air temperature is 20 to 30° below zero, a state of variation in coolant temperature from the start of the engine 1 is as shown in FIG. 7 (at the time of start, the water temperature once drops and then, rises). Therefore, in order to measure the variation amount of the water temperature until the judging timing, the lowest water temperature is preferable.

Steps 25 and 26 are the same as steps 10 and 11 shown in FIG. 5. That is, in step 25, a post-start timer TIM and a predetermined value TTH# are compared with each other. Here, the post-start timer TIM is for measuring the elapsed time after the start of the engine 1. When the post-start timer TIM shows a value smaller than a predetermined value TTH#, the current processing is completed as it is. On the contrary, when the post-start timer TIM shows a value equal to or greater than a predetermined value TTH#, it is judged that it is the judging timing (measuring timing), and the procedure is advanced to step 26 and subsequent steps. This judging timing must be set before the measuring starting time in the trouble diagnosing of the thermostat 32, of course.

In step 26, a predetermined value TOQATH and a post-start heat amount adding up value SUQATH obtained in the same manner as that described in the diagnosis of the cooling apparatus are compared with each other, and only when the post-start heat amount adding up value SUQATH is equal to or greater than the predetermined value TOQATH, the procedure is advanced to step 27 and subsequent steps. The predetermined value may be different from that used for diagnosing the cooling apparatus of course.

In step 27, a predetermined value TW# and a difference between the highest water temperature TWMA and the lowest water temperature TWMI are compared with each other. If the difference between the highest water temperature TWMA and the lowest water temperature TWMI is smaller than the predetermined value TW#, the procedure is advanced to step 28 where it is judged that the water temperature sensor 14 is in trouble (shown with "NG" in the drawing). If the difference between the highest water temperature TWMA and the lowest water temperature TWMI is equal to or greater than the predetermined value TW#, the procedure is advanced to step 29 where it is judged that the water temperature sensor 14 is in normal (shown with "OK" in the drawing).

In subsequent step 30, the diagnosis prohibiting flag F2 is set to 1, and the diagnosis is prohibited until the ignition switch is turned OFF once. Since the diagnostic result such as trouble or normal of the water temperature sensor 14 is necessary for the diagnosis of the leakage trouble of the thermostat 32, this result is stored in the RAM of the control unit 11.

On the other hand, in step 26, if the post-start heat amount adding up value SUQATH is smaller than the predetermined value TOQATH, since it is impossible to judge whether the water temperature sensor 14 is in trouble, the procedure is advanced to step 31 where the data TWMA, TWMI and TIM are cleared. When the diagnosis prohibiting flag F2 is equal to 1 in step 21, the procedure is advanced to step 32 where the data TWMA, TWMI and TIM are cleared similarly.

Figure 8A:
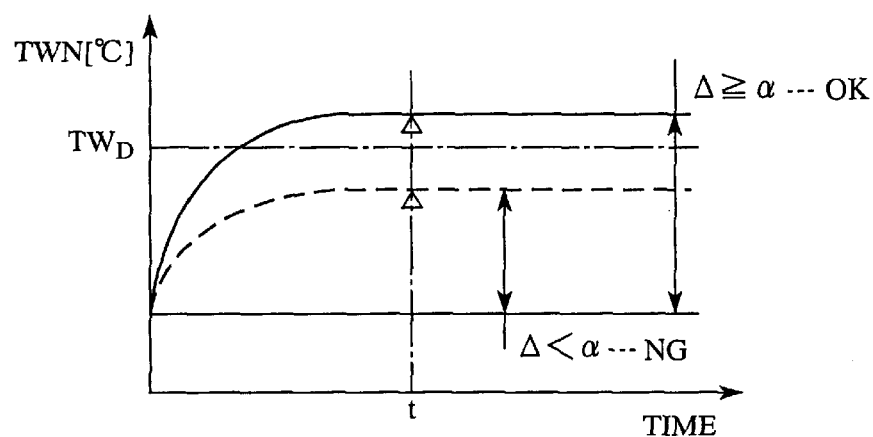
FIGS. 8A and 8B are views for explaining the trouble judgment of the water temperature sensor of the embodiment.

The operation of the present embodiment will be explained with reference to model views of FIGS. 8A and 8B.

When the output drop trouble occurs in the water temperature sensor 14, the rising movement of water temperature TWN is slow or gentle (see broken line) as compared when the water temperature sensor 14 is normal (see solid line). At that time, according to the present embodiment, a difference between the highest water temperature (=coolant temperature at the judging timing t) and the lowest water temperature (=water temperature at the time of start), i.e., a variation amount Δ becomes smaller than a predetermined value α, and it is judged that the water temperature sensor 14 is in trouble. That is, by setting the predetermined value α such that it is judged that there is trouble at the time of broken line characteristics and there is no trouble at the time of solid line characteristics, it is possible to diagnose the trouble of output drop of the water temperature sensor 14 like the conventional trouble diagnosis of the water temperature sensor.

Figure 8B:
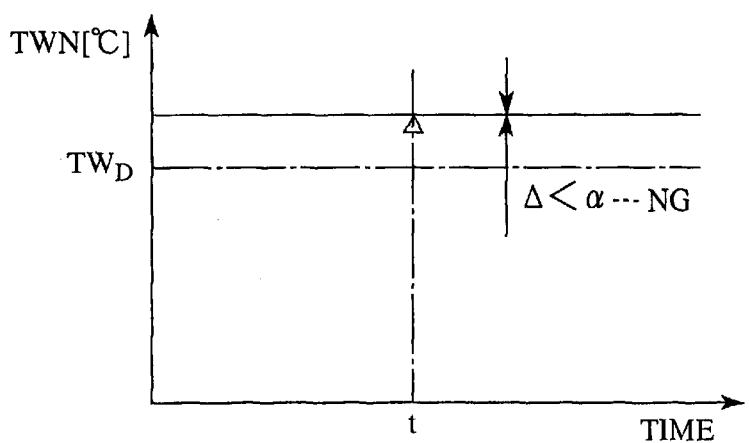
Figure 12A:
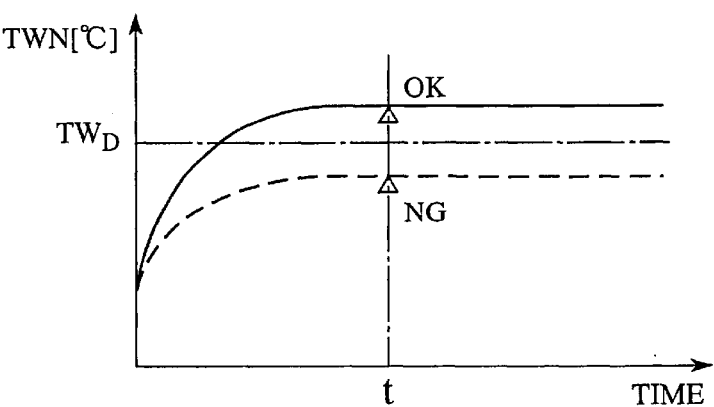
FIGS. 12A and 12B are views for explaining an analyzed trouble judgment system of a water temperature sensor.
Figure 12B:
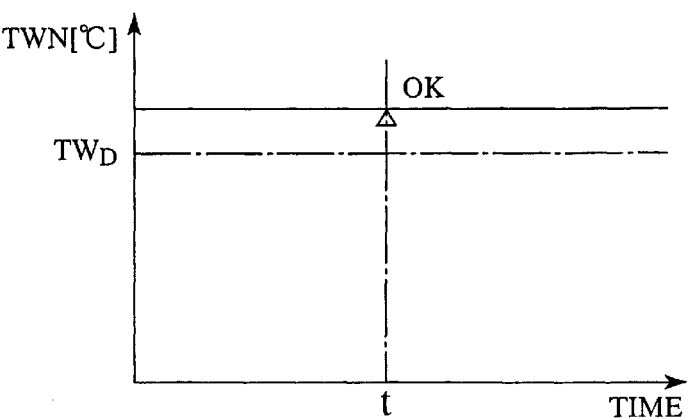

On the other hand, FIG. 8B (the same wave form as that shown in FIG. 12B) shows a case in which a trouble that the output of the sensor sticks to a value exceeding the judgment value $TW_D$ (judgment value used for the conventional trouble diagnosis of the water temperature sensor) occurs. Such a trouble could not be diagnosed by the conventional trouble diagnosis of the water temperature sensor, but according to the present embodiment, since the difference Δ between the highest water temperature (≈ water temperature at the time of the start of the engine) and the lowest water temperature (≈ water temperature at the time of the start of the engine) is substantially equal to 0 (i.e., smaller than the predetermined value α), it is possible to judge that the trouble occurs in the water temperature sensor 14.

As described above, according to the present embodiment, the highest water temperature and the lowest water temperature are sampled until the judging timing (measuring timing), and the predetermined value and the difference between the highest water temperature and the lowest water temperature are compared with each other at the judging timing, and when the difference between the highest water temperature and the lowest water temperature becomes smaller than the predetermined value, it is judged that the water temperature sensor 14 is in trouble. Therefore, it is possible to judge that a trouble occurs not only when the output of the water temperature sensor 14 drops but also when the output of the sensor 14 sticks to a value exceeding the judgment value (judgment value used for the conventional trouble diagnosis of the water temperature sensor).

In the present embodiment, the highest water temperature and the lowest water temperature are used until the judging timing (measuring timing) as parameter for judging the variation amount of the output of the water temperature sensor 14, but the present invention is not limited to this, and the water temperature at the time of start of the engine 1 and the highest water temperature, the water temperature at the time of start of the engine 1 and the water temperature at the judging timing, or the lowest water temperature and the water temperature at the judging timing can be used.

That is, the variation amount of the output of the water temperature sensor 14 can be not only the difference between the maximum value and the minimum value of the output of the water temperature sensor 14 from the start of the engine 1 to the measuring timing, but also can be any of a difference between the maximum value of the output of the sensor 14 from the start of the engine 1 to the measuring timing and the output of the sensor 14 at the time of start of the engine 1, a difference between the output of the sensor 14 immediately before the measuring timing and the output of the sensor 14 at the time of start of the engine 1, and a difference between the output of the sensor 14 immediately before the measuring timing and the minimum value of the output of the sensor 14 from the start of the engine 1 to the measuring timing.

Further, in the present embodiment, the judging timing (measuring timing) is set to a time when a predetermined time period is elapsed and the heat of the engine 1 is sufficient after the engine 1 started. However, the judging timing may be set to a time when a predetermined time period is elapsed after the engine 1 started, or when the heat of the engine 1 is sufficient after the engine 1 started.

In the present embodiment, the judgment of the convergence of the output of the water temperature sensor is omitted in the trouble diagnoses of the water temperature sensor 14 because of balance of the diagnosis precision and time, but like the leaking trouble diagnosis of the thermostat 32, the convergence of the output of the water temperature sensor 14 may be judged using a measuring section.

Although in the present embodiment, the measuring section is provided for the leaking trouble diagnosis of the thermostat 32 in the embodiment, the leaking trouble diagnosis of the thermostat 32 is not limited to a structure having the measuring section of course and for example, the starting time of the measuring section may be set as the measuring timing, and the leaking trouble diagnosis of the thermostat 32 may be carried out without judging the convergence of the output of the water temperature sensor 14.

Figure 9:
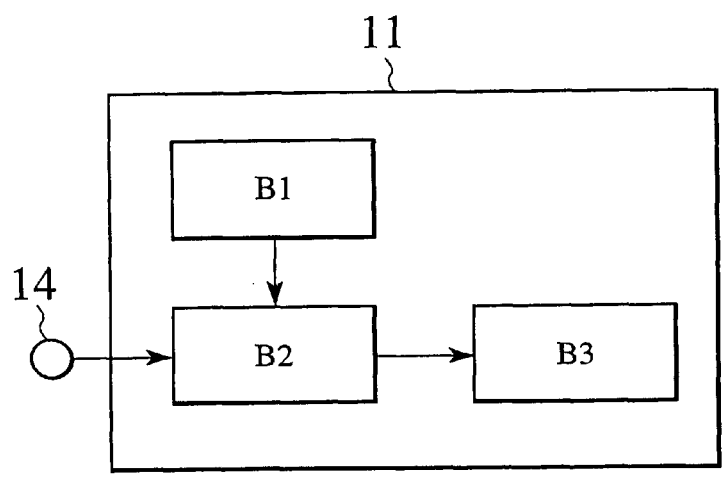
FIG. 9 is a block diagram of the water temperature sensor of the embodiment.

Functional block of the control unit 11 in the trouble judgment of the water temperature sensor 14 of the present embodiment will be summarized with reference to FIG. 9.

In FIG. 9, a setting section B1 sets the measuring time, a calculating section B2 calculates the variation amount of the output of the sensor 14, and a judging section B3 judges whether the water temperature sensor 14 is in trouble.

Here, the variation amount of the output of the water temperature sensor 14 can be not only the difference between the maximum value and the minimum value of the output of the water temperature sensor 14 from the start of the engine 1 to the measuring timing, but also can be any of a difference between the maximum value of the output of the sensor 14 from the start of the engine 1 to the measuring timing and the output of the sensor 14 at the time of start of the engine 1, a difference between the output of the sensor 14 at the measuring timing and the output of the sensor 14 at the time of start of the engine 1, and a difference between the output of the sensor 14 at the measuring timing and the minimum value of the output of the sensor 14 from the start of the engine 1 to the measuring timing.

Figure 10:
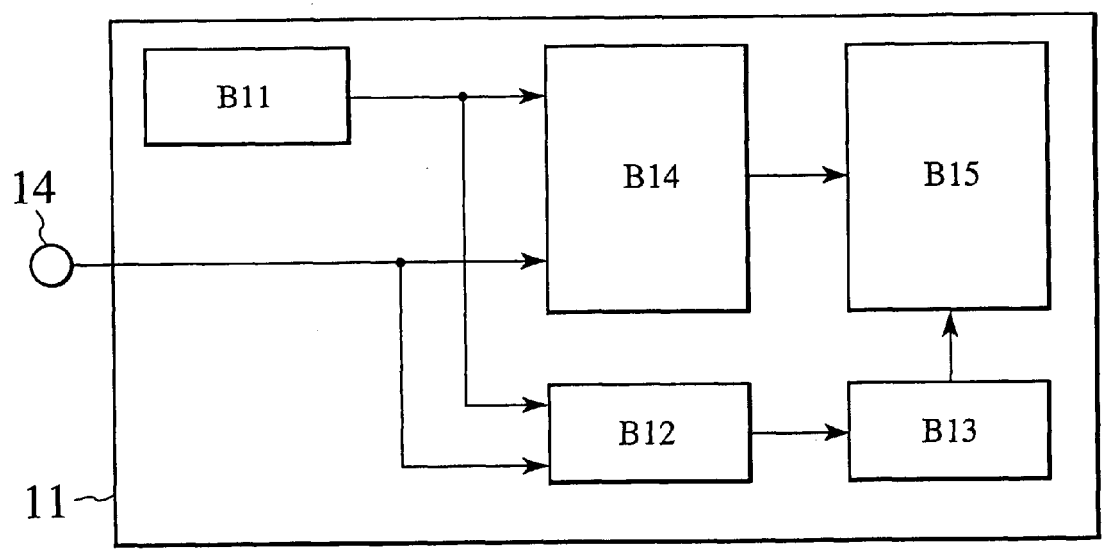
FIG. 10 is a block diagram of the diagnostic apparatus and the diagnostic method of the cooling apparatus of the embodiment.
Figure 11:
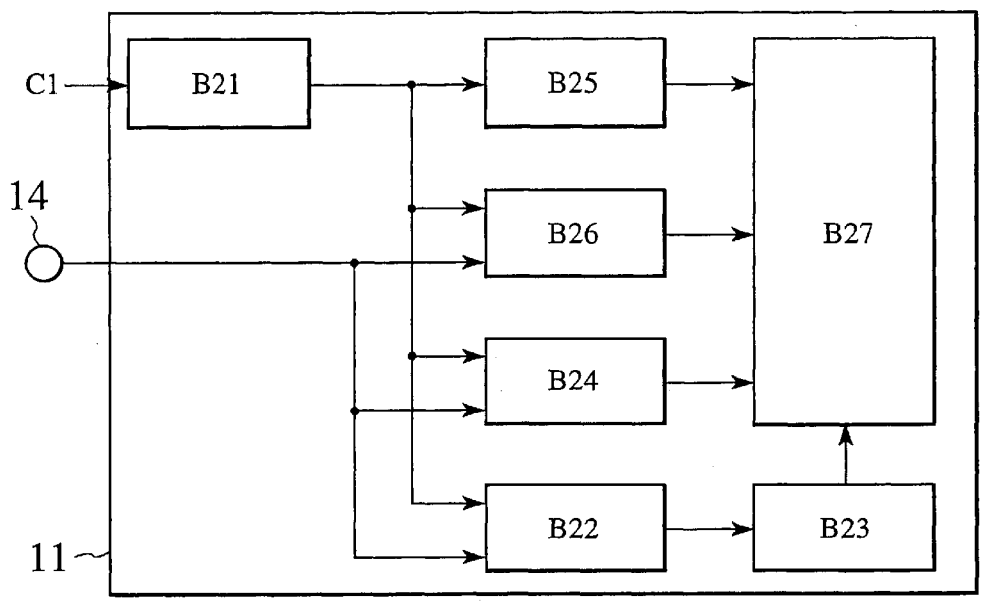
FIG. 11 is a block diagram of the diagnostic apparatus and the diagnostic method of the cooling apparatus of the embodiment.

Further, with reference to FIGS. 10 and 11, there will be summarized functional block of the control unit 11 having a structure in which a result of the trouble judgment of the water temperature sensor 14 is applied to a trouble judgment of leakage of the thermostat 32, and when it is judged that the water temperature sensor 14 is in trouble, the trouble judgment of leakage of the thermostat 32 is prohibited, that is, a trouble of the cooling apparatus is prohibited.

By referring to FIG. 10, the measuring timing is used in the trouble judgment of leakage of the thermostat 32. This is because that the judgment of the convergence of the output of the water temperature sensor 14 can be omitted by needs, though, in the embodiment, the measuring section used and the convergence of the output of the water temperature sensor 14 is judged.

In FIG. 10, a setting section B11 sets the measuring timing for the trouble judgment of leakage of the thermostat 32, a calculating section B12 calculates the variation amount of the output of the sensor 14, and a prohibiting section B13 previously judges whether the water temperature sensor 14 is in trouble. And a sampling section B14 for sampling the water temperature at the measuring timing is also provided. Further, a judging section B15 judges that the leaking trouble occurs in the thermostat 32 when the water temperature at the measuring timing obtained by the sampling section B14 is smaller than the predetermined value, but when the prohibiting section B13 judges that the water temperature sensor 14 is in trouble, the judgment of the judging section B15 is prohibited by the prohibiting section B13.

Here, too, the variation amount of the output of the water temperature sensor 14 can be not only the difference between the maximum value and the minimum value of the output of the water temperature sensor 14 from the start of the engine 1 to the measuring timing, but also can be any of a difference between the maximum value of the output of the sensor 14 from the start of the engine 1 to the measuring timing and the output of the sensor 14 at the time of start of the engine 1, a difference between the output of the sensor 14 at the measuring timing and the output of the sensor 14 immediately before the time of start of the engine 1, and a difference between the output of the sensor 14 immediately before the measuring timing and the minimum value of the output of the sensor 14 from the start of the engine 1 to the measuring timing.

Last, functional block of the control unit 11 judging a trouble of the cooling apparatus by use of the measuring section will be summarized with reference to FIG. 11.

In FIG. 11, a setting section B21 sets the measuring section. A calculating section B22 calculates the variation amount of the output of the sensor 14 from the start of the engine 1 to the measuring section, and a prohibiting section B23 previously judges whether a trouble occurs in the water temperature sensor 14. In addition, there are also provided a sampling section B24 for sampling the maximum value of the water temperature in the measuring section, a judging section B25 for judging whether sufficient heat amount of the engine 1 is confirmed in the measuring section, and a judging section B26 for judging whether the output of the sensor 14 is converged in the measuring section. Further, a judging section B27 judges that a leaking trouble occurs in the thermostat 32 when the maximum value of the water temperature in the measuring section obtained by the sampling section B24 is smaller than a predetermined value, but the prohibiting section B23 prohibits the judgment of the judging section B25 when it is judged that a trouble occurs in the water temperature sensor 14.

In such a case, the variation amount of the output of the water temperature sensor 14 can be a difference between the highest water temperature and the lowest water temperature measured from the start of the engine 1 to the starting point of the measuring section, i.e., a difference between the maximum value and the minimum value of the output of the water temperature sensor 14. Further, the variation amount can be any of a difference between the maximum value of the output of the sensor 14 from the start of the engine 1 to the start of the measuring section and the output of the sensor 14 at the time of the start of the engine 1, a difference between the output of the sensor 14 immediately before the start of the measuring section and the output of the sensor 14 at the time of the start of the engine 1, and a difference between the output of the sensor 14 immediately before the start of the measuring section and the minimum value of the output of the sensor 14 from the start of the engine 1 to the start of the measuring section.

The entire contents of a Patent Application No. TOKUGANHEI 10-305871, with a filing date of Oct. 27, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A diagnostic apparatus of a coolant temperature sensor sending out an output in correspondence to a temperature of a coolant of an engine, comprising:

a setting section setting, as a measuring timing, a time when a predetermined time is elapsed after the engine started or a time when a predetermined heat is generated;

a calculating section calculating a variation amount of the output of the coolant temperature sensor from a start of the engine to the measuring timing; and a judging section judging that a trouble occurs in the coolant temperature sensor when the variation amount is smaller than a predetermined value, wherein the variation amount of the output of the coolant temperature sensor is a difference between a maximum value of the output from the start of the engine to the measuring timing and a minimum value of the output from the start of the engine to the measuring timing.

2. A diagnostic apparatus of a coolant temperature sensor according to claim 1, wherein the coolant circulates along a predetermined path while flow rate thereof is controlled by a circulation control device, it is judged whether a trouble occurs in the coolant temperature sensor after the measuring timing, and it can be judged whether a trouble occurs in a circulation control device.

3. A diagnostic apparatus of a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator, the apparatus comprising:

a coolant temperature sensor sending out an output in correspondence to a temperature of the coolant;

a setting section setting, as a measuring timing, a time when a predetermined time is elapsed after the engine started or a time when a predetermined heat is generated;

a sampling section sampling the temperature of the coolant at the measuring timing based on the output of the coolant temperature sensor;

a judging section judging that a trouble occurs in the thermostat when the temperature of the coolant at the measuring timing sampled by the sampling section is smaller than a first predetermined value;

a calculating section calculating a variation amount of the output of the coolant temperature sensor from start of the engine to the measuring timing; and a prohibiting section prohibiting the judging section from judging when the variation amount is smaller than a second predetermined value.

4. A diagnostic apparatus of a cooling apparatus according to claim 3, wherein the variation amount of the output of the coolant temperature sensor is any of a difference between a maximum value of the output from a start of the engine to the measuring timing and a minimum value of the output from the start of the engine to the measuring timing, a difference between the maximum value of the output from the start of the engine to the measuring time and the output at the time of the start of the engine, a difference between the output immediately before the measuring timing and the output at the time of the start of the engine, and a difference between the output immediately before the measuring timing and the minimum value of the output from the start of the engine to the measuring timing.

5. A diagnostic apparatus of a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator, the apparatus comprising:

temperature detecting means sending out an output in correspondence to a temperature of the coolant;

setting means for setting a measuring timing;

sampling means for sampling the temperature of the coolant at the measuring timing based on the output of the temperature detecting means;

judging means for judging that a trouble occurs in the thermostat when the temperature of the coolant at the measuring timing sampled by the sampling means is smaller than a first predetermined value;

calculating means for calculating a variation amount of the output of the temperature detecting means from a start of the engine to the measuring timing; and prohibiting means for prohibiting the judging means from judging when the variation amount is smaller than a second predetermined value.

6. A diagnostic method of a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator, the method comprising:

sending out an output in correspondence to a temperature of the coolant;

setting a measuring timing;

sampling the temperature of the coolant at the measuring timing based on the output;

judging that a trouble occurs in the thermostat when the temperature of the coolant sampled at the measuring timing is smaller than a first predetermined value;

calculating a variation amount of the output from a start of the engine to the measuring timing; and prohibiting the judging when the variation amount is smaller than a second predetermined value.

7. A diagnostic apparatus of a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator, the apparatus comprising:

a coolant temperature sensor sending out an output in correspondence to a temperature of the coolant;

a setting section setting a measuring section after the engine started;

a sampling section sampling a maximum value of the output of the coolant temperature sensor in the measuring section;

a first judging section judging whether a predetermined heat amount of the engine is generated in the measuring section;

a second judging section judging whether the output of the coolant temperature sensor is converged in the measuring section;

a third judging section judging that a trouble occurs in the thermostat when the first judging section judges that the predetermined heat amount of the engine is generated and the second judging section judges that the output of the coolant temperature sensor is converged in the measuring section, and when the maximum value of the output of the sensor in the measuring section sampled by the sampling section is smaller than a first predetermined value;

a calculating section calculating a variation amount of the output of the coolant temperature sensor from a start of the engine to a start of the measuring section; and a prohibiting section prohibiting the third judging section from judging when the variation amount is smaller than a second predetermined value.

8. A diagnostic apparatus of a cooling apparatus according to claim 7, wherein the variation amount of the output of the coolant temperature sensor is any of a difference between a maximum value of the output from the start of the engine to the start of the measuring section and a minimum value of the output from the start of the engine to the start of the measuring section, a difference between the maximum value of the output from the start of the engine to the measuring time and the output at the time of the start of the engine, a difference between the output immediately before the start of the measuring section and the output at the time of the start of the engine, and a difference between the output immediately before the start of the measuring section and the minimum value of the output from the start of the engine to the start of the measuring section.

9. A diagnostic apparatus of a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator, the apparatus comprising:

temperature detecting means sending out an output in correspondence to a temperature of the coolant;

setting means for setting a measuring section;

sampling means for sampling a maximum value of the output of the coolant temperature sensor in the measuring section;

first judging means for judging whether a predetermined heat amount of the engine is generated in the measuring section;

second judging means for judging whether the output of the temperature detecting means is converged in the measuring section;

third judging means for judging that a trouble occurs in the coolant control means when the first judging means judges that the predetermined heat amount of the engine is generated and the second judging means judges that the output of the temperature detecting means is converged in the measuring section, and when the maximum value of the output in the measuring section sampled by the sampling means is smaller than a first predetermined value;

calculating means for calculating a variation amount of the output of the temperature detecting means from a start of the engine to a start of the measuring section; and prohibiting means for prohibiting the third judging means from judging when the variation amount is smaller than a second predetermined value.

10. A diagnostic method of a cooling apparatus provided with a cooling section carrying off heat of an engine by coolant to cool the engine, a radiator radiating the heat carried off by the coolant, and a thermostat controlling a flow rate of the coolant which circulates through the cooling section and the radiator, the method comprising:

sending out an output in correspondence to a temperature of the coolant;

setting a measuring section;

sampling a maximum value of the output of the coolant temperature sensor in the measuring section;

judging whether a predetermined heat amount of the engine is generated in the measuring section;

judging whether the output of the temperature detecting means is converged in the measuring section;

judging that a trouble occurs in the thermostat when it is judged that the predetermined heat amount of the engine is generated and that the output of the temperature detecting means is converged in the measuring section, and when the maximum value of the output in the measuring section is smaller than a first predetermined value;

calculating a variation amount of the output in accordance with the temperature of the coolant from a start of the engine to a start of the measuring section; and prohibiting the judging that the trouble occurs in the thermostat when the variation amount is smaller than a second predetermined value.

* * * * *